United States Patent [19]

Onopchenko et al.

[11] 4,219,679

[45] Aug. 26, 1980

[54] SELECTIVE HYDROGENATION OF NITRO GROUPS ON NITROAROMATIC ACETYLENES USING AN UNSUPPORTED COBALT POLYSULFIDE CATALYST

[75] Inventors: Anatoli Onopchenko, Monroeville; Edward T. Sabourin, Allison Park; Charles M. Selwitz, Monroeville, all of Pa.

[73] Assignee: Gulf Research & Development Company, Pittsburgh, Pa.

[21] Appl. No.: 958,162

[22] Filed: Nov. 6, 1978

[51] Int. Cl.$^2$ .................... C07C 79/22; C07C 85/11; C07C 85/24
[52] U.S. Cl. .................... 568/705; 260/571; 260/575; 260/580; 260/578
[58] Field of Search .................... 568/705, 704, 706; 260/571, 47 UA, 580, 575, 47 CP, 590 R, 578

[56] References Cited

U.S. PATENT DOCUMENTS

| | | | |
|---|---|---|---|
| 2,402,684 | 6/1946 | Signaigo | 252/228.4 |
| 3,118,946 | 1/1964 | Grob et al. | 260/586 |
| 3,350,450 | 10/1967 | Dovell et al. | 260/577 |
| 3,845,018 | 10/1974 | Billow et al. | 568/705 |
| 3,879,349 | 4/1977 | Billow et al. | 260/47 UA |
| 3,907,968 | 9/1975 | Kobylinski et al. | 423/213.5 |
| 4,051,177 | 9/1977 | Braden et al. | 260/510 |

FOREIGN PATENT DOCUMENTS 1431640  4/1976  United Kingdom .................... 568/705

OTHER PUBLICATIONS

Burawoy et al., "Tetrahedron", (1959), vol. 5, pp. 340-351.
Friefelder, "Practical Catalytic Hydrogenation", p. 168, (1971), Wiley.
Hennion, "J. Amer. Chem. Soc.", vol. 79, pp. 2146-2148.
Huntress, "J. Amer. Chem. Soc.", vol. 56, p. 241, (1934).
Organic Syntheses, Coll. vol. 3, pp. 69-70.
Woodburn et al., "J. Amer. Chem. Soc.", vol. 72, p. 1361.
Chem. Abs. vol. 79, (1973), p. 77771r: Chem. Abs. vol. 81, (1974), p. 151684z.

Primary Examiner—Werren B. Lone

[57] ABSTRACT

Aromatic nitroacetylene compounds wherein both the nitro and acetylene groups are directly connected to aromatic ring carbon atoms are hydrogenated at high conversion levels to selectively reduce the nitro function using an unsupported cobalt polysulfide catalyst. Of particular interest is the preparation of aminophenylacetylenes from nitrophenylacetylene.

19 Claims, No Drawings

SELECTIVE HYDROGENATION OF NITRO GROUPS ON NITROAROMATIC ACETYLENES USING AN UNSUPPORTED COBALT POLYSULFIDE CATALYST

This invention relates to a process for the selective hydrogenation of nitro groups on a nitroaromatic acetylene compound and in particular to the preparation of aminophenylacetylene from nitrophenylacetylene using an unsupported cobalt polysulfide catalyst.

BACKGROUND OF THE INVENTION

The recent introduction of acetylene-terminated polyimides to produce cured reaction products which are stable at very high temperatures of 450° C. and up has created an interest and need to produce the polyimides at attractive and competitive costs. The prime difficulty in the preparation of the acetylene-terminated polyimides which are described, for example, in U.S. Pat. No. 3,845,018 and U.S. Pat. No. 3,879,349, both to Norman Bilow et al, is the preparation of the monomers which include in one instance the preparation of meta-aminophenylacetylene (APA). This invention relates to the discovery of an unsupported cobalt polysulfide catalyst which selectively converts certain nitroaromatic acetylene compounds used in the process of this invention, e.g. nitrophenylacetylene, to the desired APA or substituted APA.

DESCRIPTION OF THE PRIOR ART

The description of the preparation of APA contained in the teachings of Bilow et al in U.S. Pat. No. 3,845,018 involves a large number of expensive and time-consuming steps. Thus Bilow et al in Column 4, lines 41 et seq., teach that an aromatic compound having both nitro and acetyl substituents is reacted, preferably under reflux, with dimethylformamide and phosphorus oxychloride to convert the acetyl radical to —C(Cl)=CHCHO. The reaction is exothermic, and external cooling is needed to keep it at approximately room temperature. The β-chloro-substituted aldehyde radical is converted to —C≡CH by refluxing a solution of the compound in p-dioxane and sodium hydroxide. The product is extracted with an organic solvent such as diethylether; the organic solution is dried; the solvent is removed; and the product recovered by vacuum distillation.

Improved techniques over those taught by Bilow et al obviously have to be developed in order to improve the competitive position of the resultant acetylene-terminated polyimides in the marketplace.

One desirable technique to prepare aminophenylacetylene is to first prepare nitrophenylacetylene and then selectively hydrogenate the nitro group. This is a considerably difficult problem, since both the nitro and acetylene groups directly connected to a ring aromatic carbon atoms are two of the most reactive groups known for hydrogenation. Undoubtedly the difficulty of selectively hydrogenating a nitro group in the conjoint presence of an acetylene moiety directly attached to an aromatic ring carbon atom accounts for the literature referring to the use of chemical reducing agents for the hydrogenation of nitro groups. For example, the literature refers to the use of zinc in ammonium hydroxide (A. Burawoy and J. T. Critchley, *Tetrahedron*, No. 5, 340 (1959)); sodium hydrosulfite (see *Organic Syntheses*, Coll. Vol. III, John Wiley & Sons, Inc., New York, N.Y. 1966 p. 69); ammonium sulfite (E. H. Huntress, L. N. Stanley and A. S. Parker, *J. Am. Chem. Soc.*, 56, 241 (1934)); ferrous sulfate (U.S. Pat. No. 3,845,018 (1974)); stannous chloride (H. M. Woodburn and C. F. Stuntz, *J. Am. Chem. Soc.*, 72, 1361 (1950); and thiourea dioxide (K. Nakagawa and K. Minami, *Tetrahedron Lett.*, No. 5, 343 (1972)) for the chemical reduction of nitro groups. The procedures, however, in the referred-to literature are generally tedious and unattractive for commercial application. Catalytic hydrogenation with molecular hydrogen is preferable for reasons of economy, safety and flexibility. No satisfactory catalytic method for the selective hydrogenation of aromatic nitro compounds in the conjoint presence of an acetylenic moiety where the acetylenic carbon is directly connected to an aromatic ring carbon atom has been reported as yet. Sokol'skii et al, however, studied competitive hydrogenation of phenylacetylene and nitrobenzene over nickel and platinum on alumina and found the addition of hydrogen to acetylene to be non-selective (K. K. Kuzenbaez, K. A. Zhubanov, and B. V. Sokol'skii, *Dokl. Vses. Konf. Khim. Atsetilena*, 4th, 1973, 3, 325; *Chem. Abs.*, 79, 77771r (1973)). Reduction of phenylacetylene over palladium on alumina occurs two to three times faster in the presence of nitrobenzene than in its absence. (K. A. Zhubanov, B. V. Sokol'skii, E. P. Mazin, et al, *Zh. Prikl. Khim.*, 47 (8) 1885 (1974); *Chem. Abs.*, 81, 151684z (1974)). Hennion and Barrett hydrogenated propargyl esters of p-nitrobenzoic acid over palladium on barium sulfate and converted the ethynyl group to vinyl without affecting the nitro functionality (G. F. Hennion and S. O. Barrett, *J. Am. Chem. Soc.*, 79, 2146 (1957). Grob and Jenny in U.S. Pat. No. 3,118,946, hydrogenated 2-nitrooctadec-4-yn-1,3-diol over Lindlar catalyst and obtained 2-nitrooctadec-4-en-1,3-diol selectively. It is obvious that the selective hydrogenation of a nitro group in the conjoint presence of the highly reactive acetylenic function where both are directly connected to aromatic ring carbon atoms on the same molecule presents a formidable problem. It is apparent that a wide spectrum of products could be expected since the nitro function, the aromatic ring and the acetylene function can all be partially or completely hydrogenated.

The most pertinent prior art to the subject invention is believed to be the more recent British Pat. No. 1,431,640, published Apr. 14, 1976, and entitled, "Process for the Preparation of Aliphatically Unsaturated Aromatic Amino Compounds".

The British patent is mainly concerned with the catalytic hydrogenation of 4,4'-dinitrostilbene-2,2'disulfonic acid to the corresponding 4,4'-diamino-2,2'disulfonic acid, as half of their working examples are with this substrate (Exs. 4–6 and 15–23). The British patent does have general teachings to the effect that aromatic nitro compounds wherein the nitro group is aromatically bonded and which contain aliphatic C-C multiple bonds can be selectively catalytically reduced so that the nitro group is converted to the amino group without substantial loss of the C-C multiple bonds. All of the working examples, save one, are concerned with the selective reduction of aromatically bonded nitro groups in the presence of carbon to carbon double bonds. The one exception is the selective hydrogenation of 2-acetylamino-4-nitrobenzoic acid propargyl ester (Ex. 12) to produce the corresponding aminobenzoic acid propargyl ester. The propargyl ester function, of course, contains an acetylenic group, but it is noted that this acetylenic group is not directly bonded to an aromatic carbon atom and thus is not "activated" by the ring.

Thus the British patent does not have a working example utilizing a charge stock which contains both a nitro group and an acetylenic group directly attached to aromatic ring carbon atoms. Furthermore, the list of suitable examples of aromatic nitro compounds contained on page 3 of the British patent cites no aromatic compound wherein both the nitro and acetylenic linkages are directly connected to aromatic carbon atoms. The British teachings to effect the above described selective reduction involve hydrogenation in the presence of a metal sulfide of the formula $MS_x$, wherein x is a number from 1 to 4, and M represents a metal atom of Group VIII of the Periodic System of the elements, or represents rhenium. According to the British patent, the reaction can occur at temperatures from 20° to 140° C. and at pressures of 5 to 150 bars of hydrogen pressure. The catalysts may be utilized unsupported (p. 2, Col. 2), or the metal sulfides may be deposited on a support wherein the active metal sulfide on the support can be between 0.1 to 5 percent by weight (p. 3, Col. 1). The patent also teaches that the catalytically active component can be employed in amounts of 0.005 to 10 percent, especially 0.05 to 5 percent relative to the nitro compounds (p. 3, Col. 1, lines 8–11). The working examples use many different types of metal sulfide catalysts, including iron, cobalt, nickel, rhenium, and ruthenium, both supported and unsupported and others. (The more recently issued U.S. Pat. No. 4,051,177, dated Sept. 27, 1977, is based on part of the specification of the British patent but is limited in its teachings to the use of a cobalt sulfide catalyst).

Morris Freifelder in "Practical Catalytic Hydrogenation", Wiley-Interscience Publishers, New York, N.Y. (1971) on page 168 states that the nitro group attached to a benzene ring, with the exception of the acetylenic linkage, is the most amenable of all reducible systems to catalytic hydrogenation. According to the author, not enough work has been carried out on the reducibility of the triple bonds in the aromatic nitro group to state authoritatively that one will be selectively hydrogenated in the presence of the other. In most other instances, an aromatically bound nitro group will be preferentially reduced in the presence of another reducible function. On page 192 of the same reference, the author concludes that the nitro group is generally preferentially reduced in the presence of olefinic bonds.

A fair summary of the above teachings of the prior art would appear to suggest that the aromatic nitro group wherein the nitro group is directly attached to an aromatic carbon atom is a highly reducible group and that it will selectively hydrogenate in the presence of olefinic double bonds, and that such a nitro group will also selectively reduce in the presence of aliphatic carbon to carbon triple bonds which are present on a chain wherein the triple bond is not directly connected to an aromatic carbon atom. Freifelder suggests that the selectivity to the reduction of the nitro group in the conjoint presence of carbon to carbon triple bonds, both directly connected to the same aromatic nucleus, is not settled, and the recent British patent would appear to suggest a wide variety of metal sulfides to selectively reduce aromatic nitro groups on certain types of compounds containing, in addition, C-C multiple bonds.

In accordance with the invention, it has now been found that of the many metal sulfide catalysts suggested by the prior art, a catalyst consisting essentially of unsupported cobalt polysulfide is surprisingly unique in the selective reduction at high conversion levels of over 50 percent of nitro groups in an aromatic nitro compound containing in addition an acetylene group directly connected to an aromatic ring carbon atom. The reaction in accordance with the invention proceeds by contacting a charge stock comprising an inert solvent and an aromatic nitro compound containing (i) at least one nitro group directly connected to an aromatic ring carbon atom and (ii) at least one acetylenic group having at least two carbon atoms and wherein at least one of the acetylenic groups is directly connected to an aromatic ring carbon atom with an unsupported catalyst consisting essentially of cobalt polysulfide and in the added presence of free molecular hydrogen under reaction conditions such that:

(1) the charge stock is maintained substantially in the liquid phase;
(2) the weight ratio of the aromatic nitro compound to cobalt as the metal is at least 25:1;
(3) the reaction temperature is from 60° C. to 140° C.; and
(4) the conversion of said nitro aromatic compound is greater than 50 weight percent.

DEFINITION OF THE CHARGE STOCK

The charge stock for the process of this invention is a nitro aromatic acetylene containing at least one nitro group directly connected to an aromatic ring carbon atom and at least one acetylenic group directly connected to an aromatic ring carbon atom through one of the acetylenic group carbon atoms. More preferably, the nitro aromatic compound charge stock has (i) from one to two nitro groups, (ii) from one to two acetylene moieties directly attached through an acetylene carbon atom to aromatic ring carbon atoms, and (iii) from one to two aromatic rings. The aromatic nucleus can be derived from benzene, naphthalene, bibenzyl, diphenyl, diphenyl oxide, diphenyl sulfide, or benzophenone, with the nitro and the acetylene groups being attached to the same or different aromatic rings. The nitro aromatic compound usually has from 8 to 30 carbon atoms and more usually has from 8 to 16 carbon atoms.

Most preferably the nitro aromatic acetylene charge stock utilized in the process of this invention has the formula:

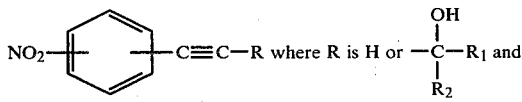

where $R_1$ and $R_2$ can be the same or different and are selected from the group consisting of hydrogen and lower alkyl groups having from 1 to 4 carbon atoms, phenyl, and substituted phenyl, and where $R_1$ and $R_2$ can form a saturated 5- or 6-membered ring.

Suitable specific examples of charge stocks which fall within the scope of this invention include but are not limited to the following materials:
3-nitrophenylacetylene;
4-nitrophenylacetylene;
2-nitrophenylacetylene;
3-(3-nitrophenyl)-2-propyne;
9-nitro-2-(prop-2-yn-3-yl)biphenyl;
5-(3-nitrophenyl)-2-methyl-hex-5-yne;
4-(3-nitrophenyl)-3-butyn-2-ol;

4-(2-nitrophenyl)-3-butyn-2-ol;
4-(4-nitrophenyl)-3-butyn-2-ol;
2-methyl-4-(3-nitrophenyl)-3-butyn-2-ol;
2-methyl-4-(2-nitrophenyl)-3-butyn-2-ol;
2-methyl-(4-nitrophenyl)-3-butyn-2-ol;
2-phenyl-4-(3-nitrophenyl)-3-butyn-2-ol;
2-phenyl-4-(2-nitrophenyl)-3-butyn-2-ol;
2-phenyl-4-(4-nitrophenyl)-3-butyn-2-ol;
3-(3-nitrophenyl)-2-propyn-1-ol;
3-(2-nitrophenyl)-2-propyn-1-ol;
3-(4-nitrophenyl)-2-propyn-1-ol;
3-methyl-5-(3-nitrophenyl)-4-pentyn-3-ol;
3-methyl-5-(2-nitrophenyl)-4-pentyn-3-ol;
3-methyl-5-(4-nitrophenyl)-4-pentyn-3-ol;
1-(3-nitrophenylethynyl)cyclohexanol;
1-(2-nitrophenylethynyl)cyclohexanol;
1-(4-nitrophenylethynyl)cyclohexanol;
1-(3-nitrophenylethynyl)cyclopentanol;
1-(2-nitrophenylethynyl)cyclopentanol;
1-(4-nitrophenylethynyl)cyclopentanol;
2-methyl-4-(2,4-dinitrophenyl)-3-butyn-2-ol;
2-methyl-4-(8-nitro-1-naphthyl)-3-butyn-2-ol;
2-methyl-4-(3-nitro-2-naphthyl)-3-butyn-2-ol;
1,4-bis(2-methyl-3-butyn-2-ol-4-yl)nitrobenzene;
9-nitro-2-[(prop-2-yn-1-ol-3-yl)]biphenyl;
2-nitro-4-(prop-2-yn-1-ol-3-yl)biphenyl;
3-nitro-3'-(prop-2-yn-1-ol-3-yl)diphenyl ether;
4-nitro-4'-(prop-2-yn-1-ol-3-yl)diphenyl ether;
3-nitro-3'-(prop-2-yn-1-ol-3-yl)diphenyl sulfide;
3-nitro-3'-(prop-2-yn-1-ol-3-yl)benzophenone;
6-nitronaphthylacetylene; etc.

The nitro aromatic compound charge stocks described above can be prepared by any suitable procedure, and the method of preparation of these materials forms no part of the present invention. For example, nitrophenylacetylene itself can be prepared by the procedure of Bilow et al in U.S. Pat. No. 3,845,018. Substituted nitro-aromatic acetylenes can be prepared by reacting nitrophenylacetylene with a ketone in the presence of an alkali metal hydroxide, e.g.

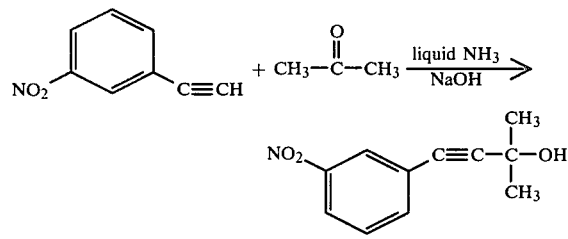

The nitro aromatic charge stocks described above are selectively hydrogenated to produce the corresponding amino aromatic acetylenes, and a list of specific examples would parallel the list of nitro aromatic compounds set forth above except "amino" would replace "nitro" in each compound.

In particular, this invention is concerned with the preparation of an aminophenylacetylene (especially metanitrophenylacetylene) and substituted amino aromatic acetylenes having the formula:

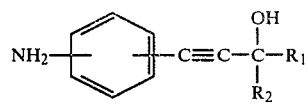

where $R_1$ and $R_2$ can be the same or different and are selected from the group consisting of hydrogen and lower alkyl groups having from 1 to 4 carbon atoms, phenyl, and substituted phenyl, and where $R_1$ and $R_2$ can form a saturated 5- or 6-membered ring.

Preferred among these amino aromatics are those wherein $R_1$ and $R_2$ are methyl; and most preferred is where the amino group is meta to the acetylene moiety.

Specific examples of amino aromatic substituted acetylenes include:
o-, m- and p-aminophenylacetylene;
4-(3-aminophenyl)-3-butyn-2-ol;
2-methyl-4-(3-aminophenyl)-3-butyn-2-ol;
2-methyl-4-(2-aminophenyl)-3-butyn-2-ol;
2-methyl-4-(4-aminophenyl)-3-butyn-2-ol;
2-phenyl-4-(3-aminophenyl)-3-butyn-2-ol;
3-(4-aminophenyl)-2-propyn-1-ol;
3-methyl-2-(2-aminophenyl)-4-pentyn-3-ol; 1-(3-aminophenylethynyl)cyclohexanol; and
1-(3-aminophenylethynyl)cyclopentanol.

The desired product of the process of this invention is aminophenylacetylene which can, of course, be prepared directly from nitrophenylacetylene.

The substituted amino-aromatic acetylenes of this invention, i.e. those wherein a hydroxyl group is present on the carbon atom adjacent the acetylene group, are intermediates in the preparation of aminophenylacetylene by simple cleavage in the presence of a catalytic amount of base, as shown below, e.g.:

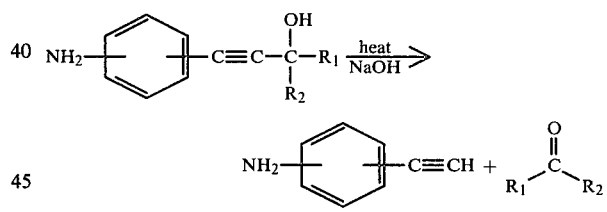

where $R_1$ and $R_2$ are as defined above.

Any alkali metal hydroxide can be utilized to perform the cleavage operation shown above, and such alkali metal hydroxides include: sodium hydroxide, potassium hydroxide and lithium hydroxide.

The aromatic nitroacetylenes described above are highly reactive as they contain both nitro and acetylene functions, both directly connected to an activating aromatic ring. It has been found necessary to operate the reaction in the presence of an inert solvent which functions not only as a heat control medium but also inhibits certain side reactions which tend to form sulfur-containing products by reaction of the aromatic nitro compound in some manner with the sulfur of the catalyst.

The type of solvent is not critical, but it is preferred to employ a solvent which is miscible with the water of reaction so that separate phases are not formed during the selective reduction reaction. This is especially important in batch phase operations using powdered catalysts which tend to clump in the presence of free water and thus prematurely stop the reaction. From the above it is obvious that the amount of solvent to employ is at least that sufficient to maintain a single liquid reaction system. Obviously the solvent must be miscible with the aromatic nitro compounds and must also resist reaction with hydrogen under the mild conditions of this invention. The weight percent of the nitroaromaticacetylene in the inert solvent can suitably be from 1 weight percent to 50 weight percent and preferably is from 6 percent to 40 percent and more preferably from 10 percent to 25 percent for the most economic utilization of the reactor volumes.

Examples of suitable solvents include but are not meant to be limited to: aliphatic alcohols having from 1 to 5 carbon atoms, such as methanol, ethanol, propanol, isopropanol and pentanol; organic esters having from 3 to 6 carbon atoms, such as ethyl acetate, methyl acetate; low molecular weight ethers, such as diethyl ether, methylpropyl ether, tetrahydrofuran and p-dioxane; low molecular weight organic acids having from 2 to 5 carbon atoms, such as acetic acid, propionic acid; and toluene.

DESCRIPTION OF THE CATALYST

The catalyst which has been found unique for effecting the selective reduction reaction of this invention at high conversion levels of over 50 percent and with high selectivity to the selective hydrogenation reaction of this invention is an unsupported cobalt polysulfide. By "cobalt polysulfide" is meant one wherein the mole ratio of sulfur to cobalt is an arithmetic average of greater than 1. Usually the catalyst is represented by the formula $CoS_x$ wherein x is greater than 1 to about 4, usually 1.5 to 4, and preferably 2 to 4. The cobalt polysulfide is, in reality, a complex mixture of various cobalt sulfides which average to a sulfur to cobalt molar ratio of from greater than 1 to about 4.

The method of producing the catalytically active cobalt polysufide is not critical, and any method described in the prior art is satisfactory. For example, a cobalt sulfide, such as is described in U.S. Pat. No. 2,402,684, or J. Am. Chem. Soc., 70, 1393 (1948), can be used.

In a preferred embodiment of the process, the cobalt polysulfide is produced by contacting a solution of a cobalt salt such as cobaltous chloride hexahydrate with an alkali or alkaline earth metal polysulfide at temperatures such that a homogeneous solution is obtained. Of course, an alkali or alkaline earth metal sulfide plus free sulfur can be utilized in place of the metal polysulfide. Other suitable cobalt salts which can be used include cobalt carbonate, cobalt chloride, cobalt hydroxide, cobalt nitrate, cobalt oxides and, of course, cobalt sulfate and their various hydrates.

It has also been found that the weight ratio of the nitroaromatic acetylene to the cobalt catalyst is important in order to avoid the production of unwanted sulfur species in the product. Thus when the weight ratio of the nitroaromatic acetylene to cobalt as the metal in the catalyst was below 25:1, undesirable sulfur species appeared in the product. Thus in accordance with the teachings of this invention, the weight ratio of the nitroaromatic acetylene to cobalt as the metal should be at least 25:1 and can be as high at 100:1 or 200:1. Preferably, the weight ratio of the nitroaromatic acetylene to cobalt as the metal is from 30:1 to 100:1 and more preferably is from 45:1 to 75:1.

The selective reduction reactions of this invention can be operated using, for example, a batch or continuous process. In a batch process, the catalyst can be in any suitable form, but is usually in the form of a powder or a paste. The weight ratio of the nitroaromatic acetylene to the catalyst in the batch process is as defined above. In a continuous process, catalyst can be added separately or in admixture with the charge stock continuously to one end of a stirred reactor while product and catalyst are continuously removed from the other end or points in between. The free molecular hydrogen necessary for the reduction reaction can be passed concurrently with the charge stock or can enter the reaction zone countercurrent to the charge stock. The hydrogen can be pure 100% hydrogen, but it is possible to use refinery hydrogen wherein the hydrogen content is between 70 and 95 volume percent.

The reaction conditions are mild and include a temperature from about 60° to 140° C., preferably 75° to 135° C. and more preferably from 85° to 125° C. The reaction rate below 60° C. is too low to be of commercial significance, while temperatures above about 140° C. tend to promote undesired reactions such as polymerization and hydrogenation of the acetylene groups and decomposition of the cobalt polysulfide catalyst.

The reaction pressure is not critical, and suitable reaction pressures include atmospheric to 150 atmospheres, preferably 10 atmospheres to 100 atmospheres. The reaction is operated, of course, in the presence of free molecular hydrogen, which at atmospheric pressure can be bubbled through the reaction mixture. The reaction is preferably operated at elevated hydrogen partial pressures of from 10 to 100 atmospheres (1.01 to 10.1 MPa). The reaction time is likewise not critical and is a function of many variables including the type of charge stock and the reaction conditions. Usually the reaction times are from 10 minutes to 100 hours; more usually the reaction time is from 30 minutes to 10 hours.

It has been found that the nitro group on the substituted nitroaromatic acetylene charge stocks of this invention is selectively reduced at high conversion levels to give unexpectedly high yields of the desired substituted amino aromatic acetylenes. The process of this invention can be operated within the range of conditions set forth above to provide weight percent conversions of the nitroaromatic compound charge stocks of over 50 weight percent and usually 70 to 100 percent, although, obviously, lower conversions can occur. The selectivities to the production of the desired corresponding amino aromatics still containing the acetylene group are usually over 70 percent and can be from 90 to 100 percent, even at the higher conversion levels.

The product recovery is not difficult and can suitably be achieved by simple vacuum or steam distillation or by fractional crystallization to separate the product from unreacted charge stock. Obviously care must be taken in the distillation of the products (or other recovery technique) from the realization that the products contain an acetylene function.

The invention will be further described with reference to the following experimental work.

EXPERIMENTAL WORK

In all of the working Examples, the nitro-aromatic acetylene charge stock was either (1) m-nitrophenylacetylene (NPA), or (2) 2-methyl-4-(3-nitrophenyl)-3-butyn-2-ol.

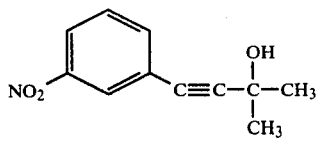

Unless otherwise noted, a batch-type reaction was employed, as follow:
(1) the feed stock was dissolved in isopropanol or methanol, which were used as the solvents;
(2) the catalyst was added, and the mixture placed into a standard one-liter, one-gallon or 5-gallon autoclave;
(3) the system was purged with hydrogen;
(4) the desired operating temperature was adjusted and then pressured with free molecular hydrogen to about 1000 psig (6.1 MPa) or less as indicated for the autoclave, and maintained in the stipulated pressure range by periodic injection of measured amounts of additional hydrogen.
(5) the reaction was allowed to proceed until the theoretical amount of hydrogen was consumed to convert the —$NO_2$ groups in the charge stock to —$NH_2$ and water as well as could be determined. (The hydrogen consumed was measured either by pressure drop or by gas-liquid chromatography of aliquots.)
(6) After the reaction was deemed complete, the reaction mixture was allowed to cool to room temperature and the mixture was then filtered through a glass frit to remove the catalyst.
(7) In the case of the 2-methyl-4-(3-aminophenyl)-3-butyn-2-ol, the liquid product was then stripped of solvent on a rotary evaporator to give a tan solid (melting point 114° to 116° C.) which on subjection to gas chromatography showed only the presence of 2-methyl-4-(3-aminophenyl)-3-butyn-2-ol.
(8) In the case of nitrophenylacetylene hydrogenation, the product was an amber-colored liquid which was recovered by distillation.

The solid product (which contained traces of solvent) was recrystallized from toluene to yield cream-colored needles having a melting point of 117° to 118° C. The cream-colored needles were shown to have a molecular weight of 175 by mass spectroscopy. The fragmentation pattern showed strong ions at (M-18)+ indicating loss of water and at (M-58)+ indicating loss of acetone from the parent ion. The nuclear magnetic resonance spectrum ($CDCl_3$) was delta (ppm) 7.2–6.6 (m, 4H), 4.6–3.8 (broad resonance, 3H, exchanges with $D_2O$), 1.56 (S, 6 H).

The elemental analysis of the cream-colored needles was as follows: C, 75.68; H, 7.38; N, 7.48. (Theoretical is C, 75.40; H, 7.48; and N, 6.99.)

From the above it was determined that the product has the molecular formula: $C_{11}H_{13}NO$.

In all of the working Examples in this specification, the term "conversion" shall mean the weight percent of the nitroaromatic acetylene, i.e. nitrophenylacetylene, or 2-methyl-4-(3-nitrophenyl)-3-butyn-2-ol converted to all products; and "selectivity" shall mean the weight of amino-aromatic acetylene, i.e. aminophenylacetylene or 2-methyl-4-(3-aminophenyl)-3-butyn-2-ol found by gas-liquid chromatography analysis in the reaction product divided by the weight of such amino aromatic acetylene theoretically expected. "Yield" is the numerical product of conversion times selectivity.

EXAMPLE 1

Preparation of Cobalt Polysulfide Catalyst

A first solution of 60 grams of cobaltous chloride hexahydrate dissolved in 375 ml of distilled water was prepared and then heated to 90° C. A second solution was prepared by mixing 60 grams of sodium sulfide nonahydrate and 16 grams of sulfur in 375 ml of distilled water, followed by heating, while stirring, to about 75° C. to achieve homogeneity. A second solution was added to the first solution, and reaction was continued, while stirring, for 15 minutes at 80°–90° C. After filtering, while hot, the catalyst was washed with 500 ml of boiling water. A total of 247 grams of black paste was obtained, containing about 16% of solids. Cobalt trisulfide ($CoS_3$) content of the cobalt polysulfide was about 30%. This catalyst was stored under nitrogen in a sealed container prior to use, to prevent oxidation.

EXAMPLE 2

Two grams of 3-nitrophenylacetylene in 100 grams of isopropanol (2% by wt. conc.) was hydrogenated in the presence of 2.0 grams of the cobalt polysulfide catalyst of Example 1 at 50° C. and 50 psig of hydrogen pressure. After 1.75 hours there was no evidence of hydrogen uptake, and reaction was discontinued. The results are summarized in Table 1 below. The reaction temperature was too low.

EXAMPLE 3

Five grams of 3-nitrophenylacetylene (NPA) in 235 grams of isopropanol (2% by wt. conc.) were hydrogenated in the presence of 5.0 grams of the cobalt polysulfide catalyst of Example 1 at 106° C. and 1000 psig (6.9 MPa) of hydrogen pressure for 45 minutes. The weight ratio of NPA to Co was 10:1. The autoclave was cooled, depressured, and the product withdrawn. The mixture was filtered to separate catalyst from the product, and the filtrate evaporated to dryness on a rotary evaporator to afford 4.0 grams of oil. Analysis by gas-liquid chromatography, internal standard procedure, showed that 92.3% of the components present in a mixture were visible in the chromatogram, and 7.7% of the product was polymeric. Of the components visible on the chromatogram, 88.7% was APA, which results in an overall yield of APA of 81 mol percent. The conversion of the NPA was 100%. Those components visible on the chromatogram were found to boil in approximately the same boiling range as the APA. The entire product gave off a strong sulfur odor. The separation of these unidentified products poses great problems. In addition, the high catalyst to NPA ratios would make such a process economically unattractive.

EXAMPLE 4

Example 3 was repeated using 10 grams of 3-nitrophenylacetylene in 197 grams of isopropanol (4.8 wt. conc.) and 5.0 grams of said cobalt polysulfide. The weight ratio of the NPA to cobalt as the metal was 20:1. After 45 minutes of reaction at 108° C. and 1000 psig (6.9 MPa) of hydrogen pressure, the reaction product was analyzed as above. The conversion of NPA was 100%, and 3.9% of the product was found to be polymeric. The remaining products were visible on the chromatogram and showed that 10.1% were unknowns boiling in the same range of the APA causing undesired and complicating separation steps in order to obtain high purity APA. The entire product gave off a strong sulfur odor. The overall yield of APA was 86%. The results are given in Table 1 below.

EXAMPLE 5

Example 3 was repeated using 25 grams of 3-nitrophenylacetylene (10% wt. conc.) in isopropanol over 8.0 grams of the cobalt polysulfide paste of Example 1. The weight ratio of NPA to Co was 50:1. After reacting for 1 hour at 120° C. and 1000 psig (6.9 MPa) of hydrogen pressure, the product was recovered. Analysis showed 90% 3-nitrophenylacetylene conversion and a 90% selectivity to desired 3-aminophenylacetylene. The entire 10% byproduct was found to be polymeric with substantially no unwanted side products boiling in the same range as APA. Thus, the residue is easily separated by simple distillation to produce a high purity APA. The results are summarized in Table 1 below.

EXAMPLE 6

Example 3 was repeated using 25 grams of 3-nitrophenylacetylene (10% wt. conc.) in methanol in the presence of 16.0 grams of a cobalt polysulfide catalyst prepared as per Example 1. The weight ratio of NPA to Co was 25:1. Reaction was carried out at 120° C., 1000 psig (6.9 MPa) of hydrogen pressure for 0.5 hours. Analysis showed quantitative conversion of feed and a 70% yield of 3-aminophenylacetylene. All byproducts were polymeric and easily separated. The results are summarized in Table 1 below.

EXAMPLE 7

Example 6 was repeated using 50 grams of 3-nitrophenylacetylene (19% wt. conc.) in isopropanol in the presence of 8.0 grams of said cobalt polysulfide catalyst (weight ratio of NPA to Co of 50:1) for 1.1 hours at 120° C. and 1000 psig (6.9 MPa) of hydrogen pressure. Analysis showed quantitative conversion and 82% yield of 3-aminophenylacetylene. All byproducts were polymeric. The results are summarized in Table 1 below.

At the end of the experiment for Example 7, the product was filtered to separate catalyst from the filtrate, and filtrate was evaporated off on a rotary evaporator to afford 40.2 grams of residue. The product was distilled using a 6-inch Vigeraux column under a reduced pressure of 1.0 millimeters of mercury to recover 30 grams of 3-aminophenylacetylene (75% yield) in 98.4% purity, boiling at 90° to 97° C. Toward the end of distillation, when the pot temperature had reached 160° C., a mild exotherm was noted which resulted in a pressure drop and an appearance of dark distillate. Distillation was therefore terminated. Thus, for safety reasons, the pot distillation temperature should not be permitted to exceed about 150° C. Analysis of residue by nuclear magnetic resonance spectroscopy showed the presence of acetophenone structure (2.45 ppm singlet), also supported by infrared spectrum (1670 cm$^{-1}$ band, ArCOCH$_3$). The nmr spectrum also contained a sharp singlet at 2.2 ppm, indicative of ArC(CH$_3$)=NAr, which suggests that this compound probably formed through reaction of acetophenone with 3-aminophenylacetylene. Acetophonones probably arose from hydration of phenylacetylene.

EXAMPLE 8

In the run for this Example, 600 grams of 3-nitrophenylacetylene in isopropanol (22% by wt. conc.) were hydrogenated in the presence of 100 grams of said cobalt polysulfide paste for 5 hours at 88° C. and 1.5 hours at 105° C. and 1000 psig (6.9 MPa) of hydrogen pressure, to afford 100% substrate (3-nitrophenylacetylene) conversion, with a 79% yield of 3-aminophenylacetylene. All byproducts were polymeric. The catalyst after filtration and air drying amounted to 20 grams and was essentially cobaltous sulfide (CoS). The organic product of 488 grams was distilled under reduced pressure using a 6-inch Vigeraux column to afford 355 grams of 3-aminophenylacetylene, boiling point 90°–94° C., at 1.0 mm of mercury. The isolated product (98% purity) corresponds to a 74% yield. This run is also summarized in Table 1 below.

EXAMPLE 9

In this experiment, 2600 grams of 3-nitrophenylacetylene in isopropanol (20% by wt. conc.) was hydrogenated in the presence of 600 grams of said cobalt polysulfide paste at 120° C., 1000 psig (6.9 MPa) of hydrogen pressure, for 1.5 hours using a 5-gallon autoclave. The catalyst from this run after drying amount to 176 grams. A total of 2293 grams of oily product was recovered. Analysis showed a 90% 3-nitrophenylacetylene conversion and a 77% yield to the desired 3-aminophenylacetylene. This run is also summarized in Table 1 below.

EXAMPLE 10

This run was made on preparative scale in a 5-gallon autoclave using 1300 grams of 3-nitrophenylacetylene in isopropanol (11% wt. conc.) in the presence of 300 grams of said cobalt polysulfide catalyst. Reaction was continued for 1.3 hours at 120° C. and 1000 psig (6.9 MPa) of hydrogen pressure. Analysis showed 97% substrate conversion and an 85% yield to desired 3-aminophenylacetylene. The remaining 15% consisted of polymeric materials, a combination of hydration, condensation, and polymerization reactions. Table 1 below summarizes this run.

PREPARATION OF COBALT POLYSULFIDE CATALYST

EXAMPLE 11

In a typical experiment, a first solution of 355 grams of cobaltous sulfate heptahydrate dissolved in 1.9 liters of distilled water was prepared and heated to about 90° C. A second solution was prepared by dissolving 300 grams of sodium sulfide nonahydrate in 1.9 liters of distilled water, heating to 90° C., and then incrementally adding 80 grams of sulfur, while stirring, to achieve a homogeneous solution. The second solution was poured into the first solution and the resulting mixture allowed to react, while stirring, at 75° to 85° C. for 30 minutes. The catalyst was filtered under suction, and the resulting black paste was thoroughly washed two times using 1 liter of boiling distilled water each time. After filtering, a total of 1068 grams of cobalt polysulfide wet cake containing approximately 18% of solids was recovered. The cobalt trisulfide (CoS$_3$) content in the cobalt polysulfide catalyst was 33 weight percent. This catalyst was stored in a closed container under nitrogen to prevent oxidation prior to use.

EXAMPLE 12

This experiment was carried out using 735 grams of 3-nitrophenylacetylene in isopropanol (6.6% wt. conc.) over 140 grams of the cobalt polysulfide paste from Example 11. After reaction time of 1.4 hours, analysis showed that 82% of feed had been converted, and that an 82% yield to desired 3-aminophenylacetylene was obtained. About 18% of product was polymeric in nature. This run is summarized in Table 1 below.

for hydrogenation of 3-nitrophenylacetylene, it is also an effective hydration catalyst for the activated phenylacetylene as well. Presence of polymeric materials in the hydrogenation product of 3-nitrophenylacetylene can be tolerated since on distillation these simply stay behind as residue.

EXAMPLES 13-17

Additional catalysts were prepared following the same procedure as in Example 1, except omitting the

TABLE 1

| | | | | | HYDROGENATION OF 3-NITROPHENYLACETYLENE OVER CoS$_3$ | | | | | | |
|---|---|---|---|---|---|---|---|---|---|---|---|
| Ex. No. | *** Wt. CoS$_3$ paste, grams | Wt. NPA, g. | Conc. % NPA in Isopropanol | Wt. Ratio NPA/Co | Temp. °C. | Pressure psigH$_2$ (MPa) | Time, Hrs. | NPA % Conv. | Selectivity to APA | APA % Yield | Remarks |
| 2 | 2.0 | 2.0 | 2.0 | 10 | 50 | 50 0.34 | 1.75 | 0 | 0 | 0 | No reaction |
| 3 | 5.0 | 5.0 | 2.0 | 10 | 106 | 1000 6.9 | 0.75 | 100 | 81 | 81 | 11.3% Unknowns** 7.7% Polymeric |
| 4 | 5.0 | 10.0 | 4.8 | 20 | 108 | 1000 6.9 | 0.75 | 100 | 86 | 86 | 10.1% Unknowns** 3.9% Polymeric |
| 5 | 8.0 | 25.0 | 10.0 | 50 | 120 | 1000 6.9 | 1.0 | 90 | 90 | 90 | 10% Polymeric |
| 6 | 16.0 | 25.0 | 10.0* | 25 | 120 | 1000 6.9 | 0.5 | 100 | 70 | 70 | 30% Polymeric |
| 7 | 8.0 | 50.0 | 19.0 | 50 | 120 | 1000 6.9 | 1.1 | 100 | 82 | 82 | 18% Polymeric |
| 8 | 100.0 | 600.0 | 22.0 | 100 | 88 105 | 1000 6.9 1000 6.9 | 5.0 & 1.5 | 100 | 79 | 79 | 21% Polymeric |
| 9 | 600.0 | 2600.0 | 20.0 | 62 | 120 | 1000 6.9 | 2.6 | 90 | 85.5 | 77 | 23% Polymeric |
| 10 | 300.0 | 1300.0 | 11.0 | 62 | 120 | 1000 6.9 | 1.3 | 97 | 87 | 85 | 15% Polymeric |
| 12 | 140.0 | 735.0 | 6.6 | 65 | 120 | 1000 6.9 | 1.4 | 82 | 86 | 72 | 18% Polymeric |

*Methanol solvent
**Boiling in same range as APA
***CoS$_3$ is an average of the S to Co ratio, and is commonly referred to as cobalt polysulfide Examples 1 and 11 show that cobalt salts in general such as cobaltous chloride and cobaltous sulfate can be used in the preparation of active cobalt polysulfide catalysts.

Data of Table 1 show the hydrogenation of 3-nitrophenylacetylene in concentrations ranging from 2% (Ex. 3) up to 22% (Ex. 8) to high yields of the desired 3-aminophenylacetylene. A temperature of 50° C. (Ex. 2) proved to be too low to give any reaction. Reasonable rates, however, were obtained with temperatures in the range of 88° C. (Ex. 8) to 120° C. (Exs. 5-7, 9-10, 12). Experience has shown that a cobalt polysulfide catalyst is not stable at temperatures much above 140° C., which suggests a useful hydrogenation temperature of 60° to 140° C., preferably 75° to 135° C., and more preferably 85° to 125° C.

The amount of catalyst needed per given amount of substrate is very important. In Examples 3 and 4, wherein the weight ratio of nitrophenylacetylene to catalyst as cobalt metal was 10 and 20, respectively, various byproducts were produced, detectable by gas-liquid chromatography, which were completely absent in runs where feed/catalyst ratios were 25 or greater. These unknown products are believed to contain sulfur linkages and therefore are not desirable since they lead to complication during recovery of 3-aminophenylacetylene by distillation since they boil in the same range. The maximum amount of feed/given amount of catalyst used in the working Examples was around 100:1 (Ex. 8). Higher ratios can be used, i.e. 200:1, but lower rates and partial conversions should be expected. Best rates were obtained with feed to catalyst ratios around 50-75. All of the useful runs produced anywhere from 10 to 30%, usually around 20% of higher molecular weight products, which result from hydration of acetylene to acetophenone, condensation of acetophenone with amine function to produce Schiff bases and polymerization. Thus, while cobalt polysulfide is an excellent catalyst addition of sulfur in Examples 13, 15 and 17. The results are summarized in Table 2 below:

TABLE 2

| Ex No | Catalyst | Metal Salt, | grams | Sodium sulfide .9H$_2$O, grams | Sulfur, grams | Catalyst paste, g. | Ca. % Solids |
|---|---|---|---|---|---|---|---|
| 13 | FeS | FeCl$_2$. 4H$_2$O | 30 | 30 | — | 59.6 | 18 |
| 14 | FeS$_x$ | FeSO$_4$. 7H$_2$O | 70 | 60 | 16 | 159.9 | 23 |
| 15 | NiS | NiCl$_2$. 6H$_2$O | 30 | 30 | — | 56.1 | 20 |
| 16 | NiS$_x$ | NiCl$_2$. 6H$_2$O | 60 | 60 | 16 | 150.1 | 26 |
| 17 | CoS | CoCl$_2$. 6H$_2$O | 30 | 30 | — | 59.9 | 19 |

EXAMPLE 18

A total of 5.0 grams of 3-nitrophenylacetylene in isopropanol (2.0% wt conc.) were hydrogenated in the presence of 5.0 grams of iron sulfide paste from Example 13. After reacting for 1.1 hours at 110° C. and 1000 psig (6.9 MPa) of hydrogen pressure, the reaction was stopped, as no further hydrogen uptake was evident. Analysis of the product, after filtration to separate the catalyst and evaporation of the solvent on a rotary evaporator, indicated 10% 3-nitrophenylacetylene conversion and essentially 100% selectivity to desired 3-aminophenylacetylene. It was estimated that 50 grams of catalyst paste will be required to convert 5.0 grams of feed completely, which is economically unrealistic. The results are summarized in Table 3 below.

EXAMPLE 19

Example 18 was repeated using 3-nitrophenylacetylene in isopropanol (2% concentration) and 5.0 grams of iron polysulfide catalyst from Example 14. Results showed only 7% conversion and 100% selectivity to 3-aminophenylacetylene. It was estimated that 71 grams of catalyst paste will be needed to convert 5 grams of feed, again economically unrealistic. The results are shown in Table 3 below.

EXAMPLE 20

Example 18 was repeated except employing 15 grams of 3-nitrophenylacetylene in isopropanol (7% wt conc.) over 5.0 grams of nickel sulfide (Ex. 15). Analysis showed only 3% conversion and 100% selectivity to 3-aminophenylacetylene. A total of 165 grams of catalyst paste will therefore be needed to convert 15 grams of feed. The results are shown in Table 3 below.

EXAMPLE 21

Example 18 was repeated except using 5.0 grams of nickel polysulfide catalyst (Ex. 16). Analysis showed 13% conversion and 85% selectivity to 3-aminophenylacetylene. It was estimated that 35 grams of catalyst paste will be needed to obtain 100% feed conversion. Table 3 contains a summary of this run.

EXAMPLE 22

Example 18 was repeated using 5.0 grams of cobalt sulfide and 15 grams of 3-nitrophenylacetylene (7% conc.). Analysis showed 12% conversion and 100% selectivity to 3-aminophenylacetylene. It was estimated that 42 grams of catalyst paste will be required to convert 5 grams of feed. The results are summarized in Table 3 below.

EXAMPLE 23

In this experiment, 3-nitrophenylacetylene was hydrogenated over commercial molybdenum sulfide powdered lubricant. After 1.25 hours at 110° C. and 1000 psig (6.9 MPa), reaction was terminated as there was no evidence of any reaction. The results are included in Table 3 below.

pressure. On workup as in Example 24, a total of 12.8 grams of amine (81% yield) was isolated, melting point 117.5° to 120° C. Example 25 shows that reducing hydrogen pressure from 1000 in Example 24 to 400 psig (2.76 MPa) had only a slight effect on reaction time.

EXAMPLE 26

2 grams of 2-methyl-4-(3-aminophenyl)-3-butyn-2-ol were dissolved in 15 ml of toluene containing one pellet (0.1 gram) of sodium hydroxide which had been crushed to a powder. The mixture was charged to a 100 ml, round-bottom flask equipped with a Dean-Stark trap and condenser. The mixture was refluxed for one hour, and the acetone byproduct was removed periodically through the Dean-Stark trap. The reaction product was then cooled, and the mixture filtered to remove particles of caustic. After the solvent was stripped, a quantitative yield of 3-aminophenylacetylene (1.4 grams) of greater than 98% purity as analyzed by gas chromatography was obtained.

Resort may be had to the variations and modifications as fall within the spirit of the invention and the scope of the appended claims.

We claim:

1. A process for the production of an aromatic amino compound containing an acetylene group directly connected to an aromatic ring carbon atoms which comprises:

contacting a charge stock comprising an aromatic nitro acetylene compound containing (i) at least one nitro group directly connected to an aromatic ring carbon atom and (ii) at least one acetylenic group having at least two carbon atoms, wherein the acetylene group is directly connected to an aromatic ring carbon atom, and wherein the aromatic portion of said aromatic nitro acetylene com-

TABLE 3

HYDROGENATION OF 3-NITROPHENYLACETYLENE OVER MeS AND MeS$_x$

Me = Metal

| No. | Catalyst paste | Wt. NPA grams | Conc., % NPA in Iso-propanol | Temp. °C. | Pressure, psig H$_2$ | (MPa) | Time, hr. | NPA % Conv. | APA Molar Selec. | Cat. paste needed for 100% Conv. | Remarks |
|---|---|---|---|---|---|---|---|---|---|---|---|
| 18 | FeS | 5.0 | 5.0 | 2.0 | 110 | 1000 | 6.9 | 1.1 | 10 | 100 | 50.0 | No further rxn. |
| 19 | FeS$_x$ | 5.0 | 5.0 | 2.0 | 110 | 1000 | 6.9 | 0.5 | 7 | 100 | 71.0 | No further rxn. |
| 20 | NiS | 5.0 | 15.0 | 7.0 | 110 | 1000 | 6.9 | 1.5 | 3 | 100 | 165 | No further rxn. |
| 21 | NiS$_x$ | 5.0 | 5.0 | 2.0 | 100 | 1000 | 6.9 | 2.25 | 13 | 84 | 35 | No further rxn. |
| 22 | CoS | 5.0 | 15.0 | 7.0 | 110 | 1000 | 6.9 | 1.25 | 12 | 100 | 42 | No further rxn. |
| 23 | MoS$_2$* | 2.0 | 10.0 | 4.5 | 110 | 1000 | 6.9 | 1.25 | 0 | 0 | — | No reaction |

*Commercial MoS$_2$ lubricant
**Polymeric byproducts were not determined.

EXAMPLE 24

20 grams of 2-methyl-4-(3-nitrophenyl)-3-butyn-2-ol in 250 grams of isopropanol was hydrogenated in the presence of a cobalt polysulfide paste prepared as above for 1.25 hours at 110° C. and 1000 psig (6.9 MPa) of hydrogen pressure. After filtration, and evaporation of the solvent, the residue was crystallized from toluene to give 13.1 grams (77% yield, recovered) of 2-methyl-4-(3-aminophenyl)-3-butyn-2-ol, melting point 117° to 120° C.

EXAMPLE 25

18.4 grams of 2-methyl-4-(3-nitrophenyl)-3-butyn-2-ol in 250 grams of isopropanol was hydrogenated in the presence of 7 grams of cobalt polysulfide catalyst for 1.7 hours at 110° C. and 400 psig (2.76 MPa) of hydrogen pound is selected from the group consisting of benzene, naphthalene, bibenzyl, diphenyl, diphenyl oxide, diphenyl sulfide and benzophenone, in an inert solvent with an unsupported catalyst consisting essentially of cobalt polysulfide and in the added presence of free molecular hydrogen under reaction conditions such that:

(a) the aromatic nitroacetylene and solvent are maintained substantially in the liquid phase;

(b) the weight ratio of the nitroaromatic actylene to cobalt as the metal is at least 25:1;

(c) the reaction temperature is from 60° C. to 140° C.; and (d) the conversion of said nitroaromatic acetylene is greater than 50 weight percent.

2. A process in accordance with claim 1 wherein the charge stock is nitrophenylacetylene.

3. A process in accordance with claim 1 wherein the inert solvent is an organic oxygen containing compound.

4. A process in accordance with claim 3 wherein the organic solvent is selected from the group consisting of alcohols having from 1 to 5 carbon atoms, esters having from 3 to 6 carbon atoms, tetrahydrofuran, p-dioxane and organic acids having from 2 to 5 carbon atoms.

5. A process in accordance with claim 4 wherein the aromatic nitro compound charge stock has a single aromatic ring.

6. A process in accordance with claim 5 wherein said aromatic nitro compound is nitrophenylacetylene.

7. A process in accordance with claim 6 wherein said nitrophenylacetylene is 3-nitrophenylacetylene.

8. A process in accordance with claim 5 wherein said charge stock contains an hydroxyl group on the carbon atom adjacent to the acetylene group, and the hydrogenation reaction occurs at a temperature from 75° C. to 135° C.

9. A process in accordance with claim 8 wherein the aromatic nitro compound has the formula:

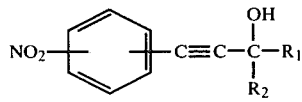

where $R_1$ and $R_2$ can be the same or different and are selected from the group consisting of hydrogen and lower alkyl groups having from 1 to 4 carbon atoms, phenyl, and substituted phenyl, and where $R_1$ and $R_2$ can form a saturated 5- or 6-membered ring.

10. A process in accordance with claim 9 wherein the nitro compound is 2-methyl-4-(3-nitrophenyl)-3-butyn-2-ol.

11. A process in accordance with claim 1 wherein the weight ratio of the nitro aromatic acetylene charge stock to cobalt as the metal in the catalyst is from 30:1 to 100:1; the weight percent of the nitroaromatic acetylene in the inert solvent is from 10% to 25%; and the reaction temperature is from 85° to 125° C.

12. A process in accordance with claim 11 wherein the solvent is an alcohol having from 1 to 3 carbon atoms.

13. A process in accordance with claim 12 wherein the solvent is isopropanol.

14. A process in accordance with claim 12 wherein the solvent is methanol.

15. A process in accordance with claim 13 wherein the nitroaromatic acetylene is a nitrophenylacetylene.

16. A process for the preparation of aminophenylacetylene which comprises:
forming a reaction by contacting a nitrophenylacetylene in an inert solvent with an unsupported catalyst consisting essentially of cobalt polysulfide and in the added presence of free molecular hydrogen and under reaction conditions such that:
(a) the aromatic nitroacetylene and solvent are maintained substantially in the liquid phase;
(b) the weight ratio of the nitroaromatic acetylene to cobalt as the metal is at least 25:1;
(c) the reaction temperature is from 60° C. to 140° C.; and
(d) the conversion of said nitroaromatic acetylene is greater than 50 weight percent;
and distilling said reaction product to directly recover aminophenylacetylene having a purity of at least 97%.

17. A process in accordance with claim 16 wherein the weight ratio of nitrophenylacetylene to cobalt is from 30:1 to 100:1 and the reaction temperature is 85° C. to 125° C.

18. A process in accordance with claim 1 wherein the cobalt polysulfide has the formula $CoS_x$ where x is from 2 to 4.

19. A process in accordance with claim 1 wherein said cobalt polysulfide catalyst is prepared by contacting a solution of a cobalt salt such as cobaltous chloride hexahydrate with an alkali or alkaline earth metal polysulfide.

* * * * *